Sept. 8, 1959 L. H. HUTCHINSON 2,903,188
CONTROL OF TROPICAL CYCLONE FORMATION
Filed April 2, 1956 3 Sheets-Sheet 1
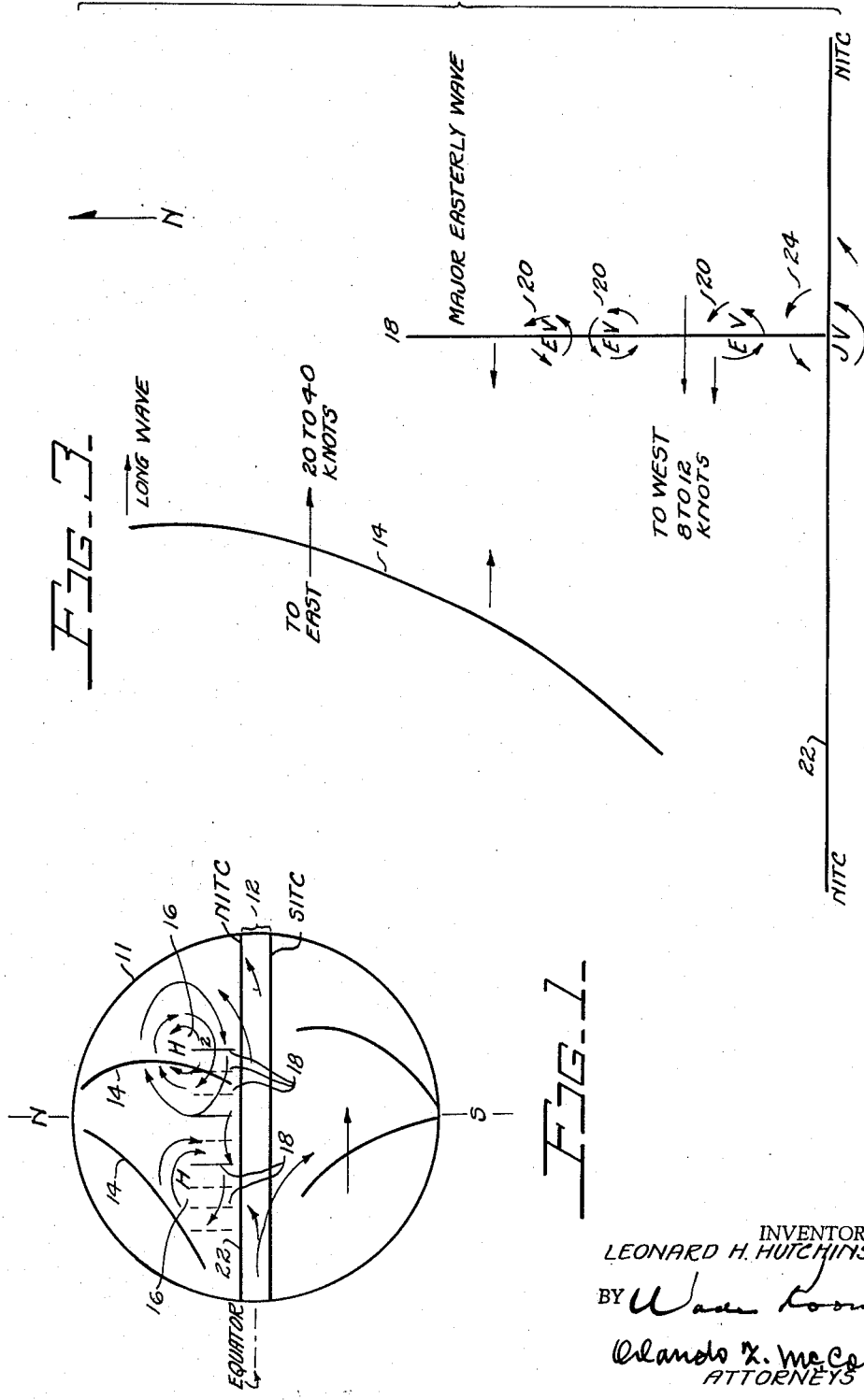
INVENTOR.
LEONARD H. HUTCHINSON
BY
ATTORNEYS Sept. 8, 1959 L. H. HUTCHINSON 2,903,188
CONTROL OF TROPICAL CYCLONE FORMATION
Filed April 2, 1956 3 Sheets-Sheet 2
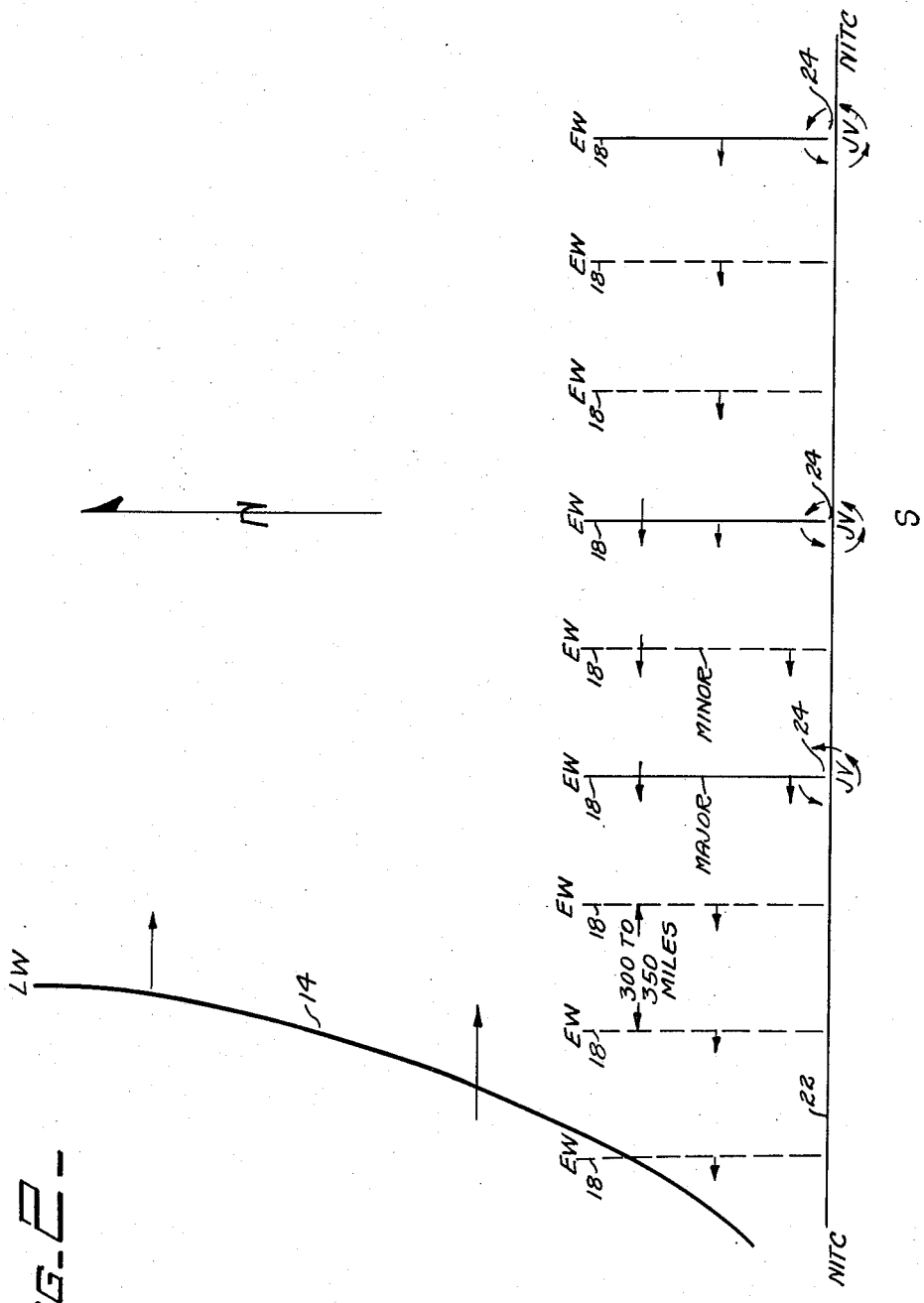
INVENTOR.
LEONARD H. HUTCHINSON
BY
ATTORNEYS

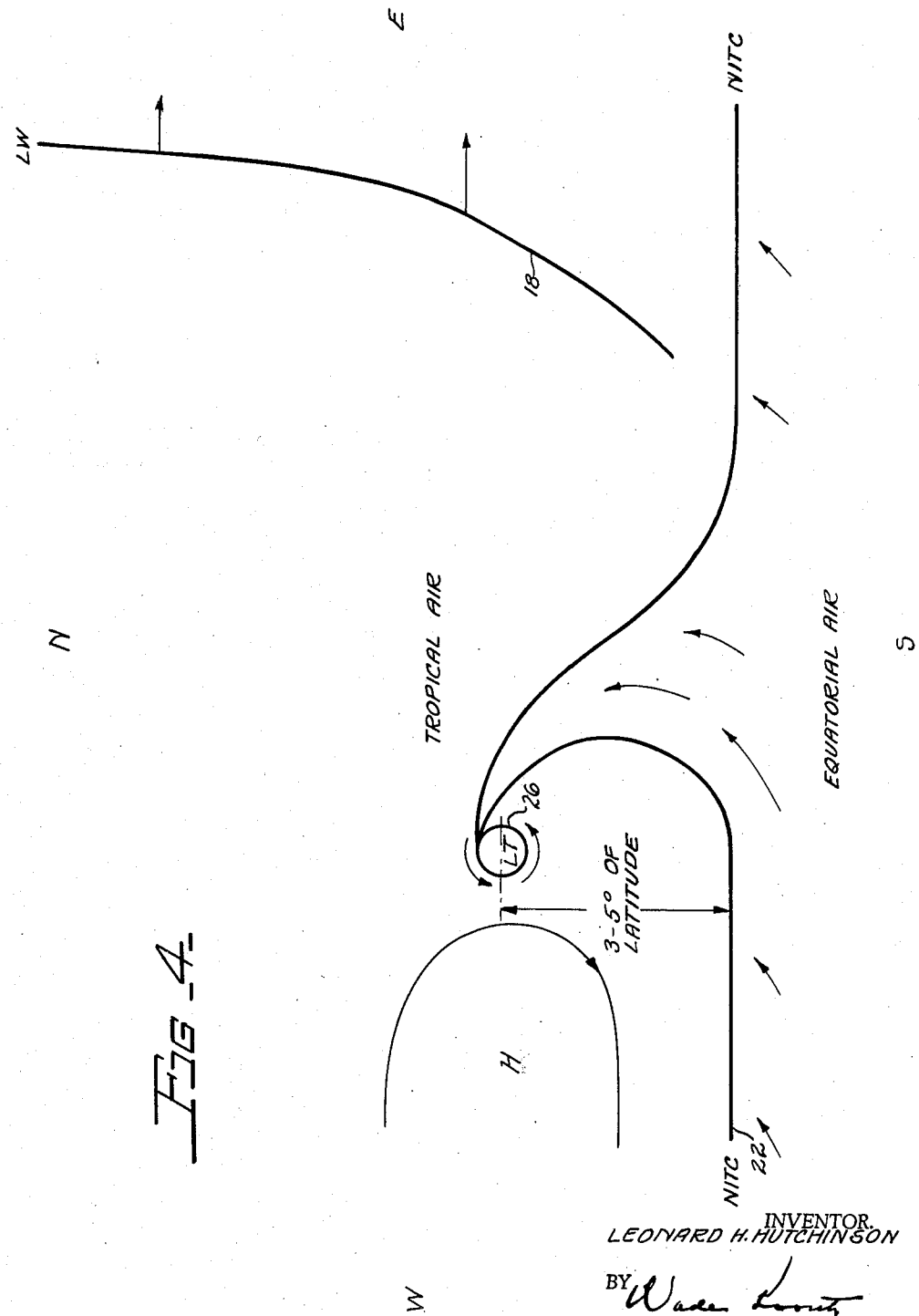

United States Patent Office 2,903,188
Patented Sept. 8, 1959

2,903,188

CONTROL OF TROPICAL CYCLONE FORMATION

Leonard H. Hutchinson, Washington, D.C.

Application April 2, 1956, Serial No. 575,689

2 Claims. (Cl. 239—2)

(Granted under Title 35, U.S. Code (1952), sec. 266)

The invention described herein may be manufactured and used by or for the United States Government for governmental purposes without the payment to me of any royalty thereon.

This invention is a process or a method for controlling or arresting the development of storms of the tropical cyclone class, such as hurricanes, typhoons and the like.

The generation of a tropical storm is controlled by the pressure systems existing near the earth's surface in the temperate and tropical zones, and the pressure systems existing at higher altitudes over the temperate and tropical zones. The pressure systems near the earth's surface form moving weather systems which are of themselves of moderate force and of no particular danger. However, when the more powerful of moving weather systems come under the influence of pressure systems moving in the high atmosphere certain of these weather systems become intensified into tropical cyclones. However, the surface weather systems which may produce tropical cyclones may be identified and readily tracked, and the pressure systems in the upper atmosphere may be identified as to location and speed of motion.

If the energy level in the potentially dangerous surface weather systems is reduced sufficiently prior to intensification thereof by the pressure systems in the upper atmosphere, no tropical cyclone will develop. The energy in such a weather system, before intensification, which must be dissipated in order to reduce the system to a stable level is of sufficiently small magnitude that it may be accomplished by nucleation of the cloud formation associated with it. However, once the process of intensification has begun, the energy content becomes too large for any preventive action to be effective.

Temperature differences in the atmosphere largely determine the physical state of vapors carried by the atmosphere. Water vapor in its liquid and solid states may be induced anywhere in the atmosphere under proper temperature and seed crystal cultivation. Cloud seeding or nucleation under natural and uninduced circumstances may be accomplished by suspended particles which serve as centers for the condensation of water drops, hail or snow or as condensation nuclei in the atmosphere at supercooled temperatures and under unstable conditions. Artificial nucleation commonly is accomplished by the use of smoke, dust, vaporized sodium chloride, silver iodide or the like, by snow, flake ice, micronized carbon particles, cement, clay, calcium chloride, sodium iodide, silver iodide, lead mono and diiodides, potassium iodide, liquid and solid carbon dioxide, liquid and solid air, liquid and solid oxygen, aluminum oxide, aluminum sulfate, iron sulfate, iron oxide, zinc cyanide, zinc sulfide, zinc oxide, sodium aluminum silicate, apatite, sodium hydroxide and equivalent materials. One or more of the above materials in sufficient quantities is planted or distributed from an aircraft, a missile, a bomb or the like, within a cloud in an unstable condition as an inducement to alter the energy content of the cloud and cause it to return to a stable condition by releasing its retention of illustratively water content to the action of gravity. The least energy principle of physics is roughly that a system is in stable equilibrium only under those conditions for which its potential energy is at a minimum. The energy content is higher in a cloud to the extent of the water vapor the cloud contains and in magnitude by the energy required to form water from the water vapor in changing the water vapor to its liquid or solid state. The same cloud without the water has lost energy in a magnitude measured by the water the cloud has lost. An article in the American Meteorological Society publication volume 30, page 194, published in May 1949, computes the energy content of each square mile of water one inch deep as rain to be twice the energy content of the atomic bomb dropped on Hiroshima in Japan during the recent war. The same article estimates that the energy throughout a hurricane with maximum winds of 125 miles per hour is being transformed at the rate of 2½ atomic bombs per second.

The present invention has for its object the modification before intensification of potentially dangerous weather formations through the application of nucleation of cloud formations so that no tropical storm occurs.

The general statement of the nature and the substance of the present invention, commensurate, consistent and in harmony with the subject matter of the claims appearing in the patent issuing hereon, comprise in nature the application of artificial cloud nucleation to control the development of tropical cyclones, hurricanes, typhoons or the like, and in substance a method of using an aircraft, such illustratively as missiles, in dispersing nuclei into major easterly waves for the purpose of reducing the energy content thereof and imparting impotence thereto in the forming of a storm.

A general statement object of the present invention, commensurate to the invention as claimed, is to provide a control of tropical cyclonic formations for the purposes of avoiding losses in life and property which attent their performance.

Another object is to reduce the predominant cumulus activity of major or strong easterly waves by artificial cloud nucleation, to make the easterly waves so treated minor or weak easterly waves and to materially reduce their energy content and thereby minimize or eliminate their capacity to form storms of dangerous magnitude.

The weather which prevails in the tropics at a given time and which will prevail within a forecastable period is produced by the interaction of several phenomenon which may be understood by reference to the appended drawings, in which:

Fig. 1 is a diagram of a typical weather pattern of the northern hemisphere.

Fig. 2 is an enlarged section of Fig. 1, taken about the line 2—2 on Fig. 1.

Fig. 3 is a diagram illustrating the development of a tropical storm after it has formed, as later described herein; and Fig. 4 is a further enlargement of Fig. 2 showing specific details of Fig. 2.

Referring now to Fig. 1 there is shown a circle 11 representing the earth which revolves about an axis extending through its poles. About the equator there is found the Intertropical Zone of Convergence (ITC) 12, which is an east-west belt of equatorial air, with a normal width of approximately 15° of latitude. This Intertropical Zone of Convergence separates the north-east trade winds of the northern hemisphere from the southeast trade winds of the southern hemisphere. Its boundaries appear as two quasi-parallel lines of intermittent convergence and divergence, the zones of the deviation extending in an east-west direction for three to eight hundred miles. The moisture content of the equatorial air has been observed to be considerably higher than that of air north or south of the ITC at corresponding elevations or heights above the surface.

There exist in the higher atmosphere pressure patterns which extend substantially over the entire hemisphere and within this pattern there are a plurality of low pressure zones extending into the tropics. These low pressure zones known as long waves (LW), polar troughs, major westerly troughs, or polar fronts, numbering from three to five in each hemisphere, which are indicated by the lines 14 in the drawings. Long waves, as they will be referred to herein, are normally identified at an altitude of twenty to sixty thousand feet, and move from west to east in the tropics at speeds usually of 20 to 40 knots. The identification of long waves is best determined by observations over a very wide area, preferably world-wide. The location and speed are predicable for a period of time of a day or more.

Within this framework there normally exist smaller systems of winds and pressures at low altitudes called high and low pressure zones, high and low cells, or anticyclones and cyclones. In the present application I am concerned with high cells (H) or anticyclones such as are indicated by 16 on Fig. 1. In the northern hemisphere the winds move in a clockwise direction about the center of the high cell (H), while in the southern hemisphere the winds move in a counterclockwise direction. South of a high cell in northern hemisphere, the winds move in an east to west direction.

In subtropical ocean areas the high cells are semipermanent, being centered at approximately 25° north or south latitudes and extend 30° to 40° of longitude and 15° to 25° of latitude. This type of high cell produces the trade winds accompanied by a series of waves known as easterly waves (EW), which are the result of disturbances or perturbations in the easterly circulation. These EW's, indicated by 18 on Fig. 1, are normally oriented on a north-south line extending poleward four to six hundred miles from approximately 5° north or south latitude. The EW's move in an east-to-west direction at 8 to 12 knots, and occur at intervals of 300 to 350 miles apart. The formation, like the high cell, is relatively stable. The approach of an EW causes the wind to shift from its normally easterly direction to north-easterly, and its passage is indicated by a shift of the wind to a southeasterly direction. Thereafter, the wind returns to the normal direction. The weather activity found in the easterly waves is random and may be classified into two general groups:

(a) A minor EW, in which there may be a small accumulation of fair weather cumulus clouds which do not extend above about 7000 feet above sea level, and (b) A major EW, which contains clouds of the cumunembaus type extending above 7000 feet and which contain thunderstorm activity. They will also contain closed or rotating circulations known as embedded vortexs (EV) (20 in Fig. 4) along its length, which EV's may number two to four or possibly six.

The major EW is one of very few weather systems which exists completely within the environs of a single air mass and is not caused by a discontinuity of a physical property, such as a cold or warm front in temperate latitudes. Since the cloud formation is not caused by a discontinuity or an external condition, it is relatively stable and, if reduced in magnitude by nucleation, will not quickly reform. A period of at least thirty-six hours is required for the formation of a major EW from a minor EW. A major EW is readily identified from aircraft flying in the area since the weather system extends from the surface to between 30 and 40 thousand feet.

The sun's heat on the surface of the ocean causes extensive evaporation of water, which evaporation absorbs a large quantity of heat. This heat is liberated when the water vapor condenses to liquid, as in the formation of rain, and heats the atmosphere, causing the air to rise, etc. The water vapor in the atmosphere thus is capable of liberating an enormous quantity of heat energy.

The temperature of the atmosphere decreases as the altitude increases. Hence, if air containing sufficient moisture vapor is caused to rise, the moisture vapor may be condensed to produce heating which raises more water vapor, and so on. Under proper conditions this process increases the strength of a tropical cyclone.

Referring now to Fig. 2, there is shown the northern boundary 22 of the intertropical zone of convergence (NITC) with a series of easterly waves 18 extending northward therefrom. The occurrence of minor and major easterly waves is random, and for the purposes of illustration the assumed major easterly waves are indicated by a solid line while minor easterly waves are indicated by dashed lines.

The juncture of a major EW with the NITC 22 will produce a rotating air mass because of the trade winds and the equatorial winds in this area. This vortex, called a junction vortex (JV) 24 does not of itself produce tropical cyclones but is useful in forecasting. It produces a disturbance in its area which may be observed visually or by weather radar.

When an LW 14 becomes superimposed over the major EW 18, the disturbance within the air mass is intensified, and the disturbance may appear centered about the junction vortex. However, as the LW and EW break apart or fracture, an embedded vortex 20 which has been contained within the EW will be intensified, and increase in intensity at the expense of the junction vortex. The intensified embedded vortex indicated at 26 on Fig. 3 will be located 3 to 5° north of the NITC 22.

It has been observed further that weak or open northern quadrants of the junction vortex with strong or convergent southern quadrants of the storm will, upon fracture, indicate the development of an embedded vortex with subsequent gating, whereas strong and convergent northern quadrants of the junction vortex with weak or open southern storm quadrants will, upon fracture, indicate the development of a junction vortex without subsequent gating. A junction vortex initially is stronger than and may mask the circulation of an embedded vortex.

After fracture, the embedded vortex develops rapidly at the expense of the juncture vortex 24 having weak or open northern quadrants, and may give the impression that the storm has suddenly jumped a few hundred miles to the north. This intensification may be the cause for a subsequent gating of the intertropical zone of convergence. The embedded vortex, after fracture, may increase its speed of movement and may be at a maximum distance of one or two degrees latitude west of the junction vortex at the gating time. The above actions concerning the two types of junction vortexs are reversed in the southern hemisphere.

Tropical cyclones by definition are classified currently as tropical disturbances, as tropical depressions, tropical storms and as hurricanes, typhoons or the like dependent upon their maximum winds and listed in increasing order from approximately 15 knots to 64 knots and above.

In the form of a tropical disturbance the circulation is slight, approximately 15 knots, and may also be observed as the junction vortex which is formed by the intersection of an intertropical zone of convergence with an easterly wave existing before the superpositioning of a major westerly trough or a long wave moving west to east above the easterly wave.

A tropical depression is a tropical cyclone in which the maximum surface wind speed is 33 knots, which is about 38 miles per hour, or normally, it is an embedded vortex as described above just subsequent to fracture.

A tropical storm is a tropical cyclone in which the maximum surface wind speed is within the range of from about 34 to 63 knots per hour, or about 39 to 72 miles per hour.

Hurricanes, typhoons or the like, are tropical cyclones in which the maximum surface wind speed is 64 knots and above, or about 73 miles per hour and above.

The incidence of an intertropical zone of convergence with a long wave and a major easterly wave in initiating a hurricane, typhoon or the like, passes through as successive transition stages, first "superposition," second "fracture," third "gating," and fourth the "tropical storm."

The first stage is the superposition of long wave moving in an easterly direction, or substantially toward the east, over a major easterly wave heading in a westerly direction or substantially toward the west.

The second transition stage is where the superimposed systems fracture and develop a tropical storm following a depression stage created by superposition. For further development there must exist a high cell or ridge line above about 30,000 feet elevation over the formation area to provide the divergence aloft to support the convergence at the lower levels.

The third transition stage of gating may be defined as the action of the convergent boundary of the intertropical zone of convergence which breaks or gates into the center of the storm developing 3 to 5° north in the northern hemisphere, or 3 to 5° south in the southern hemisphere, of the junction vortex in the major easterly wave during a 48 hour period after the fracture. This action permits the high moisture content of equatorial air to enter the storm circulation and to maintain continuously the source of equatorial air throughout the existence of the storm or cyclone in tropical latitudes.

The fourth transition stage in a storm of the cyclone, hurricane, typhoon, etc. class, is the geographical designation for the further intensification of the tropical storm using Beaufort 12 or more, such as 64 knots or above or 74 miles per hour wind velocity and above, as a criterion of the wind force of the storm.

In the above four transition stages of tropical storm development, the introduction of artificial cloud nucleation is made prior to the first transition stage of superposition of the long wave over the major easterly wave. Artificial cloud nucleation made in the advanced first transition stage or in the second transition stage, where the long wave and the major easterly waves have started to fracture each other, when the existence of a tropical cyclone is established, would not produce immediate storm dissipation because of the great amount of water and energy present in the westerly trough and in the major easterly wave. The high moisture content and the resultant large energy potential from the second transition stage of storm formation through the complete storm intensification is believed to be beyond the storm reduction capabilities of artificial cloud nucleation.

Natural dissipation of a tropical depression will take place with accompanying torrential rains in the magnitude of one inch per hour for a maximum of 30 hours, in the absence over the formation area of a ridge line or a high cell above 30,000 feet altitude. Artificial cloud nucleation should be applied to the major easterly wave prior to superposition time to prevent flood damage.

The ideal period for artificial cloud nucleation of a major EW is prior to the superimposition of the LW over the EW. The dissipation of the EW must be completed prior to any intensification but should not be completed for so long a period of time that the intensity of the EW can restore itself. The optimum time of nucleation is so as to have its completion approximately eighteen hours before the center line or axis of the LW and the major EW are superimposed.

The artificial nucleation should cover the entire area occupied by the major EW and may be accomplished by one or a plurality of aircraft depending upon the area involved or by missile or other suitable means. The present invention is not limited to the particular method of artificial nucleation employed on the equipment used to perform it. Such methods are known to those skilled in the art, and any effective method is unable in the present invention.

As previously stated, the long wave 14 moves from west to east at a speed usually of 20 to 40 knots, while the easterly waves move from east to west at a speed of 8 to 12 knots. The locations of the LW's and the major EW's and their speeds relative to the earth are measured by weather observation stations and weather aircraft over a large portion of the earth's surface, and the consolidated reports are computed and printed as weather maps and information which is available to weather forecasters. From this information, the time and the location of superimposition are readily calculated. Hence, the location of the easterly wave at a time eighteen hours before superimposition with a long wave and the correct time for nucleation may be determined. Fig. 4 illustrates this condition.

A highly desirable end result in the practice of the present invention is the reduction in the number and in the violence of tropical cyclones with an attendant reduction in loss of lives and of property resulting therefrom.

It is to be understood that the method and the means contemplated hereby have been cited as being applied to particular meteorological circumstances and locations and that limited modifications may be made therein without departing from the spirit and the scope of the present invention.

What I claim is:

1. The method of preventing the development of a tropical storm which comprises determining the speed and location of a major easterly wave and of long waves, determining the location of the major easterly wave at a period of time between eighteen and thirty hours before superimposition thereof with said long wave, and applying nucleation to said major easterly wave within that time and at the location thus determined.

2. The method of preventing the development of a tropical storm which comprises determining the location of a major easterly wave before superimposition with a long wave and the time at which said easterly wave will be superimposed with the long wave and applying nucleation to said major easterly wave at a time such that said nucleation is completed approximately eighteen hours before the superimposition.

References Cited in the file of this patent

UNITED STATES PATENTS

| | | |
|---|---|---|
| 2,527,230 | Schaefer | Oct. 24, 1950 |
| 2,550,324 | Brandau | Apr. 24, 1951 |
| 2,570,867 | Schaefer | Oct. 9, 1951 |

FOREIGN PATENTS

| | | |
|---|---|---|
| 61,460 | France | Nov. 17, 1954 |
| | (Addition to No. 1,010,878) | |
| 492,559 | Italy | Mar. 27, 1954 |
| 834,296 | Germany | Mar. 17, 1952 |

OTHER REFERENCES

"Physical Meteorology," John C. Johnson, published by Wiley and Sons, Inc., New York (1954), pages 260–270.

"Weather Elements," T. A. Blair, published by Prentice-Hall Inc., fourth edition (1953), pages 173–179.

Science 112 (2898): 35–41, July 14, 1950, "Control of Precipitation . . . ," by J. Langmuir, note particularly page 41, last paragraph.